(12) United States Patent
Dinan et al.

(10) Patent No.: US 10,200,310 B2
(45) Date of Patent: Feb. 5, 2019

(54) FABRIC-INTEGRATED DATA PULLING ENGINE

(71) Applicant: Intel Corporation, Santa Clara, CA (US)

(72) Inventors: James Dinan, Hudson, MA (US); Mario Flajslik, Hopkinton, MA (US); Keith Underwood, Powell, TN (US); David Keppel, Mountain View, CA (US); Ulf Rainer Hanebutte, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 14/757,892

(22) Filed: Dec. 24, 2015

(65) Prior Publication Data

US 2017/0185561 A1    Jun. 29, 2017

(51) Int. Cl.
G06F 15/167    (2006.01)
H04L 12/931    (2013.01)
G06F 15/173    (2006.01)

(52) U.S. Cl.
CPC ........ *H04L 49/35* (2013.01); *G06F 15/17331* (2013.01)

(58) Field of Classification Search
CPC .......................... H04L 49/35; G06F 15/17331
USPC ......................................................... 709/212
See application file for complete search history.

(56) References Cited

U.S. PATENT DOCUMENTS

| | | | |
|---|---|---|---|
| 2008/0082735 A1* | 4/2008 | Shiga | G06F 13/28 711/103 |
| 2009/0198918 A1 | 8/2009 | Arimilli et al. | |
| 2010/0014525 A1* | 1/2010 | Rehman | G06F 13/387 370/395.7 |
| 2010/0195491 A1* | 8/2010 | Gray | H04L 47/10 370/230 |
| 2010/0241813 A1* | 9/2010 | Shen | G06F 9/52 711/144 |

(Continued)

FOREIGN PATENT DOCUMENTS

| | | |
|---|---|---|
| WO | 2006055026 A1 | 5/2006 |
| WO | 2017112346 A1 | 6/2017 |

OTHER PUBLICATIONS

Barret et al., "The Portals 4.0.2 Network Programming Interface", Sandia National Laboratories, dated Apr. 2013; printed Oct. 2014; 154 pages.

(Continued)

*Primary Examiner* — Wing F Chan
*Assistant Examiner* — Joseph R Maniwang
(74) *Attorney, Agent, or Firm* — Patent Capital Group

(57) ABSTRACT

In an example, there is disclosed a compute node, comprising: first one or more logic elements comprising a data producer engine to produce a datum; and a host fabric interface to communicatively couple the compute node to a fabric, the host fabric interface comprising second one or more logic elements comprising a data pulling engine, the data pulling engine to: publish the datum as available; receive a pull request for the datum, the pull request comprising a node identifier for a data consumer; and send the datum to the data consumer via the fabric. There is also disclosed a method of providing a data pulling engine.

26 Claims, 8 Drawing Sheets

(56) References Cited

U.S. PATENT DOCUMENTS

| | | | |
|---|---|---|---|
| 2010/0306479 A1* | 12/2010 | Ezzat .................... | G06F 15/167 |
| | | | 711/147 |
| 2012/0215979 A1* | 8/2012 | Hunt ................... | G06F 12/0802 |
| | | | 711/118 |
| 2014/0111243 A1* | 4/2014 | Kumar Goel ...... | G01R 31/2601 |
| | | | 324/762.02 |
| 2014/0173338 A1 | 6/2014 | Arroyo et al. | |
| 2016/0100010 A1 | 4/2016 | Flajslik et al. | |

OTHER PUBLICATIONS

Dinan et al., "One-Sided Append: A New Communication Paradigm for PGAS Models." In Proceedings of the 8th International Conference on Partitioned; OpenSHMEM User Group 2014; 11 pages.
Message Passing Interface Forum, "MPI: A Message-Passing Interface Standard", Version 2.0; Sep. 21, 2012; 852 pages.
OpenSHMEM, "Application Programming Interface", Version 1.2; Mar. 15, 2015; 82 pages.
Table of Contents of Proceedings of the 8th International Conference on Partitioned Global Address Space Programming Models (PGAS); Eugene, OR.; Oct. 7-10, 2014.
International Search Report and Written Opinion issued in International Application No. PCT/US2016/063795 dated Apr. 28, 2017; 13 pages.

* cited by examiner

FABRIC-INTEGRATED DATA PULLING ENGINE

STATEMENT REGARDING FEDERALLY-FUNDED RESEARCH

This invention was made with Government support under contract number H98230-13-D-0124 awarded by the Department of Defense. The Government has certain rights in this invention

FIELD OF THE SPECIFICATION

This disclosure relates in general to the field of high-performance computing, and more particularly, though not exclusively to, a system and method for providing a fabric-integrated data pulling engine.

BACKGROUND

High-performance computing, also called cluster computing, is a computing strategy in which a large number of processing cores are tightly coupled so that they can perform large computations in parallel. Data to be operated on may be divided into a number of slices that can be distributed across many different cores. A large number of cores may simultaneously perform the same operation on different data, and then report the result. In this context, a "producer" is a node that has data available. A "consumer" is a node that is to receive those data.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
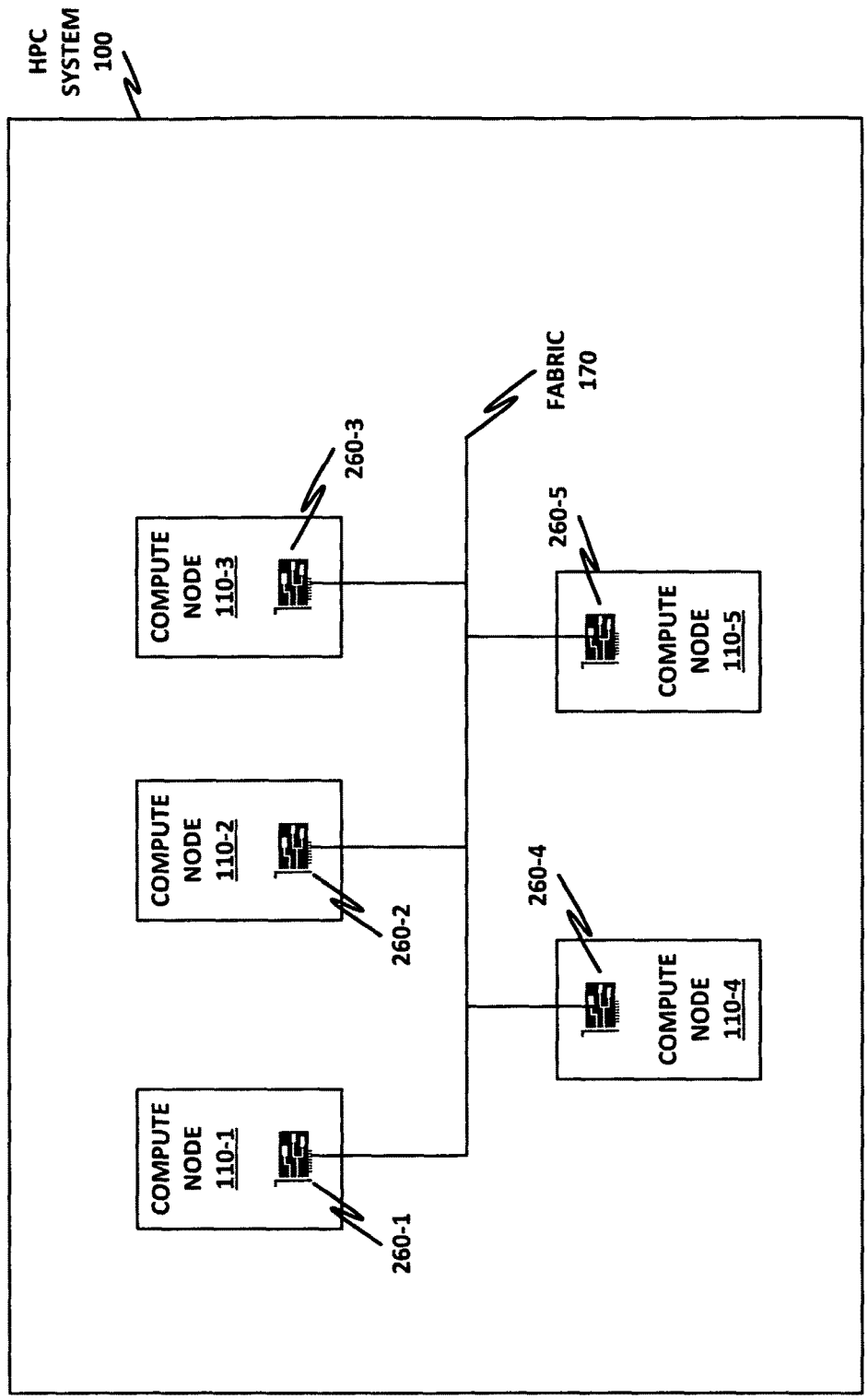
FIG. 1 is a block diagram of a high-performance computing (HPC) system according to one or more examples of the present specification.

In an example, there is disclosed a compute node, comprising: first one or more logic elements comprising a data producer engine to produce a datum; and a host fabric interface to communicatively couple the compute node to a fabric, the fabric interface comprising second one or more logic elements comprising a data pulling engine, the data pulling engine to: publish the datum as available; receive a pull request for the datum, the pull request comprising a node identifier for a data consumer; and send the datum to the data consumer via the fabric. There is also disclosed a method of providing a data pulling engine.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Some existing HPC fabrics and communication stacks face limitations in providing efficient support for data transfers in which producers and consumers are paired dynamically. In such relationships, a producer may not know the identity of the consumer. For example, in dynamic load balancing using work stealing, or in a thread pool programming pattern such as a web server, the producers of work or data may not know who the consumer will be. As a result, some existing architectures require multiple communication operations to coordinate a dynamic producer-consumer data transfer.

For example, consider the implementation of a dynamic data transfer using the Message Passing Interface (MPI), which is an industry-standard HPC communication library that provides two-sided (i.e., matched send and receive) messaging. MPI assumes a protocol where senders initiate contact with receivers; as a result, it does not provide direct support for an anonymous send operation. Instead, dynamic data transfers in MPI's matched send-receive model require an application-level request-response protocol to be used, in which the producer periodically checks for incoming requests from any consumer, and generates a response once it sees the request.

Certain embodiments of this approach incurs overheads that can severely impact performance. For example:
 a. The producer incurs a polling overhead.
 b. The producer's polling interval generates' latency to the consumer because of the resulting delay in responding to incoming requests.
 c. Additional coordination messages must be transmitted generating both fabric and endpoint overheads.

On the other hand, one-sided communication models also exist, such as "symmetric hierarchical memory" (OpenSHMEM), and the MPI remote memory access (RMA) interface. These may provide asynchronous read (get), write (put), and atomic update operations. These operations can eliminate polling and latency overheads by allowing the consumer to directly access the producer's memory. However, additional synchronization between all of the consumers may need to be performed to locate and match available data entries, and to ensure that two consumers don't corrupt memory when accessing the producer's memory directly.

This synchronization impacts communication efficiency and can incur serialization overheads when multiple consumers request data from the same producer.

The present specification describes, in one embodiment, a communication operation comprising a one-sided pull, which allows consumers to request data from a producer using a single, asynchronous communication operation. In an example, this communication model is supported efficiently through a Data Pulling Engine (DPE) that is integrated with the fabric endpoint, and coordinates consumption of a producer's data by multiple consumers.

This one-sided pull is suitable for implementing dynamic producer-consumer data transfers. This mechanism can be efficiently offloaded to suitable hardware, such as in one embodiment hardware supporting the "Portals 4" interface.

In an embodiment, the Data Pulling Engine (DPE) is integrated with a fabric endpoint and eliminates the overheads described in the previous embodiments. In particular, the engine is immediately responsive when a pull is received, eliminating polling overheads incurred by both the producer and consumer. The engine is able to achieve a pull with a single round-trip message, initiated by the consumer, increasing communication efficiency further. Because the HFI-integrated DPE manages responding to multiple consumers, it also minimizes serialization overheads.

A one-sided pull is an operation that can be used by a consumer to retrieve information from a producer. The DPE of the present specification differs from two-sided messaging in that the producer application is passive and does not participate directly in the data transfer. It also differs from one-sided messaging (e.g. an OpenSHMEM or MPI one-sided get operation) in that the consumer does not select a specific datum it will retrieve. Rather, it requests a datum from a data species, and can receive any datum from that species. A further distinction from one-sided get is that once a datum has been pulled, it is ensured that the same datum will not be retrieved by a subsequent pull operation.

The present DPE can be implemented using hardware and software components, and may be integrated with a host fabric interface (HFI) in an HPC system to achieve the greatest benefit. The DPE intercepts one-sided pull operations performed by consumers, matches them against data that have been produced, and provides an immediate and asynchronous response.

In an embodiment, the DPE maintains a data pool that contains data elements available to consumers. Data in the pool may be produced locally or remotely, and are added to the DPE at a particular node in an HPC system through a locally or remotely performed push operation. Data tracked by the pool may have an application-supplied tag, indicating a data species. Items in the same species may have an associated ordering (e.g., the application may specify that they should be consumed in first-in-first-out last-in-first-out order). The user may also supply a tag in a pull request (or they may submit a wildcard tag), and this tag may be used by the data pool to identify the data item that will be consumed. Additional information such as the amount of data requested and consumer's process ID may also be used by the data pool in associating a pull request with a data item. Depending on the model selected by the user, a data pull may consume an entire datum, or it may partially consume a datum allowing subsequent pulls to consume the remainder of the datum.

In an example, when the DPE receives a pull, it performs the following:
 a. Extract tag (species identifier), consumer ID, and requested size from the pull request
 b. Query the data pool using the pull request parameters.
 c. If the data pool finds a matching datum, it provides a buffer pointer and size to the DPE.
 d. DPE sends the response to the consumer immediately.
   i. Once a datum has been consumed, the data pool updates the datum by removing all or a portion of the datum from the pool.
   ii. A notification is generated at the consumer when the pull response has been received to notify the consumer that a datum is available. The notification may further contain additional information such as the amount of data received and the species tag.
 e. If the data pool cannot find a matching datum, it may try the following:
   i. The DPE sends an empty response to the consumer indicating that no data item matching their request was found.
   ii. The DPE sends a "pending" response to the consumer indicating the DPE has enqueued their request and will respond when a data item becomes available.
   iii. When pull requests are pending at a particular DPE, data pool may attempt to match any new data items against pending requests.
   iv. If ordered data are present, it may be necessary to perform this check in the order in which requests were received and before the new data are added to the pool.
   v. If ordering is not enabled, attempts to match pending pull requests may be performed in parallel after data have been added to the pool.
 f. For pulls marked as pending, a subsequent DPE pull response can take a variety of forms, depending on what is requested by the consumer or supported by the system. For example, the consumer may set up a region of memory allowing the DPE to perform a put operation to transmit the pull response. Alternatively, a push operation can be used to append data to a posted buffer or the data pool at the consumer.
   i. Upon completion of the pull response at the consumer, a notification is generated at the consumer.

In some cases, a DPE may be implemented using a "Portals 4" HFI. One-sided pull operations can be supported on a variety of networks through a software implementation of the DPE. Performance enhancements may be achieved through hardware implementations.

On a Portals 4 network, several embodiments of the DPE can be implemented that may be sufficient for a range of application usage models. For example, if only local pushing is supported, the data pool can be implemented as a list of match entries (MEs) that can be posted with one datum per ME. Data can be consumed entirely, or in part if the ME has the PTL_ME_MANAGE_LOCAL option set. A truncation entry is appended to the overflow list to generate a zero byte response if no matching datum is available. Delayed responses are possible through software if a full event is captured at the producer upon truncation. Pull operations may be performed by the consumer through a call to PtlGet( ), with the desired species tag embedded into the match bits. The PtlGet( ) can be sent to the Portal table entry on the matching interface that corresponds to the producer's data pool.

A system and method for providing a fabric data pulling engine will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a high-performance computing (HPC) system according to one or more examples of the present specification. HPC system 100 may be any suitable HPC system, including for example a supercomputer, computing cluster, Beowulf cluster, or distributed network, as appropriate to the embodiment.

HPC system 100 includes a plurality of compute nodes. In this case, each node may be any suitable computing device, system, or subsystem. For example, each compute node 110-4 could be a blade server, rack-mount server, or stand-alone server. Each computer node 110 could be or comprise a system on a chip. (SoC), or each compute node 110 could be housed in a standalone chassis.

In the illustrated example, five compute nodes, 110-1, 110-2, 110-3, 110-4, and 110-5 are shown. However, this is merely an illustration of the operational principle. In operation, any number of compute nodes 110 could be provided. For example, HPC system 100 could be a Beowulf cluster built of a small number of commodity, off-the-shelf computers, laptops, or blades. Or HPC system 100 could be a high-end supercomputer, with many thousands of homogeneous nodes providing petaflops of processing power.

Each compute node 110 communicatively couples to a fabric 170 via a host fabric interface (HFI) 260. Specifically, compute node 110-1 couples to fabric 170 via HFI 260-1. Compute node 110-2 communicatively couples to fabric 170 via HFI 260-2. Compute node 110-3 communicatively couples to fabric 170 via HFI 260-3. Compute node 110-4 communicatively couples to fabric 170 via HFI 260-4. Compute node 110-5 communicatively couples to fabric 170 via HFI 260-5.

Compute nodes 110 may be in any suitable configuration, including for example a motherboard-based design in which HFI 260 is an insertable card, such as a PCIe card. Compute node 110 may also be implemented on a multi-chip package, single-board computer, or system-on-a-chip, by way of nonlimiting example.

Fabric 170 may be any suitable fabric for communicatively coupling compute nodes 110 to one another. This may take the form of, for example, Intel® OmniPath™ architecture, Infiniband, Ethernet, or any other suitable fabric.

Figure 2:
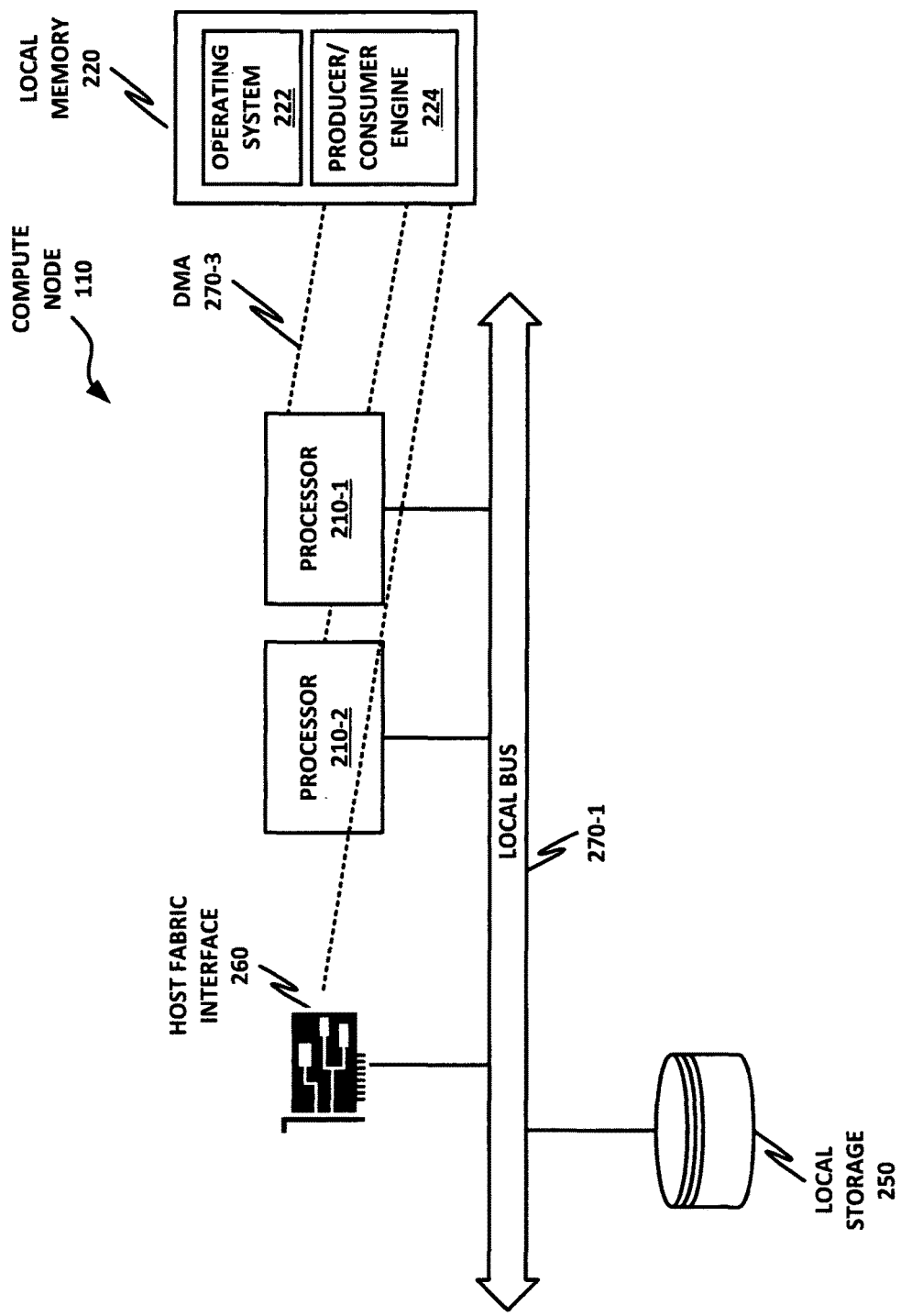
FIG. 2 is a block diagram of a compute node according to one or more examples of the present specification.

FIG. 2 is a block diagram of compute node 110 according to one or more examples of the present specification. Compute node 110 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

Compute node 110 includes one or more processors 210. In this example, two processors are shown, namely processor 210-1 and processor 210-2. These are communicatively coupled to a local memory 220, having stored therein executable instructions for providing an operating system 222 and at least software portions of a producer/consumer engine 224. Other components of compute node 110 include an optional storage 250, and host fabric interface 260. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a host fabric interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processors 210 are communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of producer/consumer engine 224. Many other configurations are also possible, and are intended to be encompassed within the broad scope of this specification.

Host fabric interface 260 may be provided to communicatively couple compute node 110 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Producer/consumer engine 224, in one example, is operable to carry out computer-implemented methods as described in this specification, including acting as either a producer of data or a consumer of data. These relationships are described in more detail in connection with FIG. 3.

Producer/consumer engine 224 may include one or more tangible non-transitory computer-readable mediums having stored thereon executable instructions operable to instruct a processor to provide a producer/consumer engine 224. As used throughout this specification, an "engine" includes any combination of one or more logic elements, of similar or dissimilar species, operable for and configured to perform one or more methods provided by the engine. Thus, producer/consumer engine 224 may comprise one or more logic elements configured to provide methods as disclosed in this specification. In some cases, producer/consumer engine 224 may include a special integrated circuit designed to carry out a method or a part thereof, and may also include software instructions operable to instruct a processor to perform the method. In some cases, producer/consumer engine 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that producer/consumer engine 224 may also include other hardware and software, including configuration files, registry entries, and interactive or user-mode software by way of non-limiting example.

In one example, producer/consumer engine 224 includes executable instructions stored on a non-transitory medium operable to perform a method according to this specification. At an appropriate time, such as upon booting compute node 110 or upon a command from operating system 222 or a user 120, processor 210 may retrieve a copy of the instructions from storage 250 and load it into memory 220. Processor 210 may then iteratively execute the instructions of producer/consumer engine 224 to provide the desired method.

Depending on the role that compute node 110 plays in HPC system 100, producer/consumer engine 224 may operate as a data producer engine or as a data consumer engine. As a data producer engine, producer/consumer engine 224 may be configured to operate on a data set and produce data for consumption by other nodes, or a data producer engine may be configured to aggregate outputs from other processes and compile them into suitable inputs for different processes.

As a data consumer engine, producer/consumer engine 224 may be configured to consume inputs from other processes. To provide just one example, a common task for parallel computing is calculating discrete values in a sequence of parallel difference equation, where each stage operates on an output of a previous stage. Thus, at each stage, a data producer engine may collect outputs from a previous stage, place them into a data pool, and then receive data requests from a plurality of data consumer engines, each running an identical difference equation. In that case, the data producer engine provides the data to the data consumer engines, and then again collects the outputs.

Figure 3:
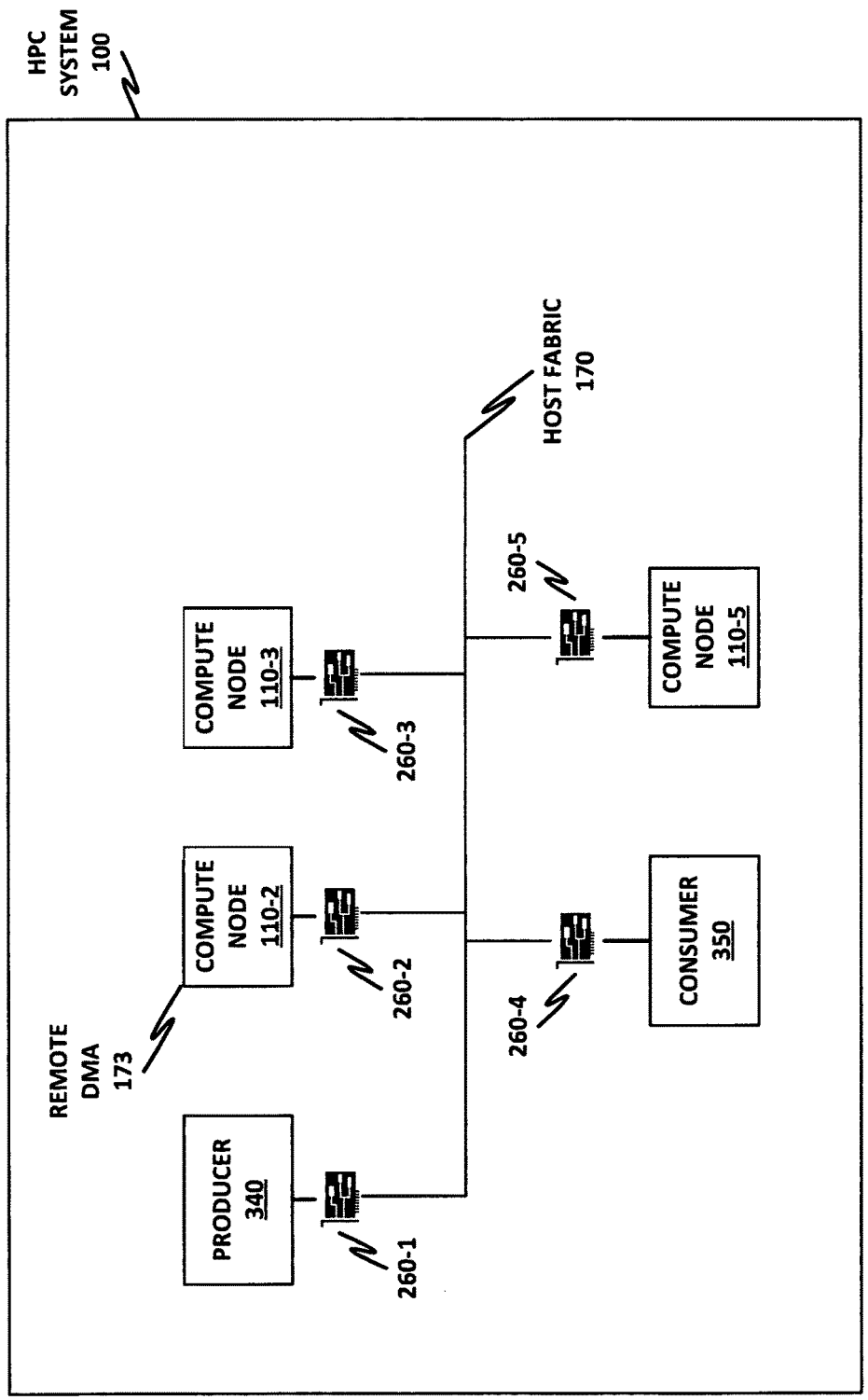
FIG. 3 is a block diagram of a producer-consumer architecture according to one or more examples of the present specification.

FIG. 3 is a block diagram of HPC system 100 illustrating that certain nodes can act as producers or consumers as discussed above. In this example, node 340 acts as a data producer. Node 350 acts as a data consumer. In this example, producer 340 and consumer 350 are illustrated by way of example as being on two separate modes. It should be understood, however, that producer 340 and consumer 350 could be on the same compute node 110.

HPC system 100 may be configured to run a massively parallel computing task. This may be a task that lends itself to being divided into smaller memory chunks, each of which can be handled by a separate compute node 110. In such a case, producer 340 may prepare data packets for parceling out to compute nodes 110.

Consumer 350 may have a portion of code that is can use to operate on data. That same code may be reproduced across many consumers 350, even up to tens or hundreds of thousands of consumers 350. Thus, as illustrated herein, complete two-way synchronization between one or more producers 340 and one or more consumers 350 may be impractical. On the other hand, one-way communication also carries certain challenges as discussed above. Thus the present specification provides a fabric integrated data pulling engine that may be considered "one-and-a-half" way communication.

Specifically, consumer 350 need not be aware of or care which section of data it is operating on. Rather, consumer 350 runs a procedure that has a set of given inputs, and that produces a set of outputs from those inputs. Those outputs may be the input to a next stage. Thus, consumer 350 need only concern itself with getting a datum to operate on, without worrying about how that datum fits into the overall picture of the computation. The data structure, meaning the inputs and the outputs that consumer 350 needs to operate on, is referred to herein as a species of data. In other words, there is a particular datum, which should be understood in this context to mean a structured packet, which may include a particular format and types of values, that consumer 350 needs to receive. When consumer 350 requests a datum, it may request a specific species, or it may wildcard at least some entries. Producer 340 may produce one or many data that fit the profile of the particular species that consumer 350 needs.

Thus, according to one example, consumer 350 sends a data request to producer 340. Producer 340 may have a pool of data of the appropriate species for consumer 350. Thus, producer 340 may select a datum from those data and provide that datum to consumer 350 according to the methods disclosed in this specification. Consumer 350 can then operate on that datum, complete its function, and then perform any reporting function that it needs to do. Once consumer 350 has completed its task, it may be prepared to receive a new datum. Thus, consumer 350 may again send a request to producer 340. Producer 340 may then provide a new datum to consumer 350.

If data are not available when consumer 350 requests a datum, then producer 340 may queue the request. Requests can optionally be queued in first-in-first-out order, in which case queued requests may be handled before new data are added to the pool. In another embodiment, queued requests are unordered, and are handled in parallel once sufficient data have been added to the pool. In other embodiments, any other suitable queuing method may be used, such as last-in-first-out and round robin by way of nonlimiting example. In some embodiments, producer 340 sends a signal to consumer 350 indicating that the request has been received, and that it has been queued but not yet handled.

Figure 4:
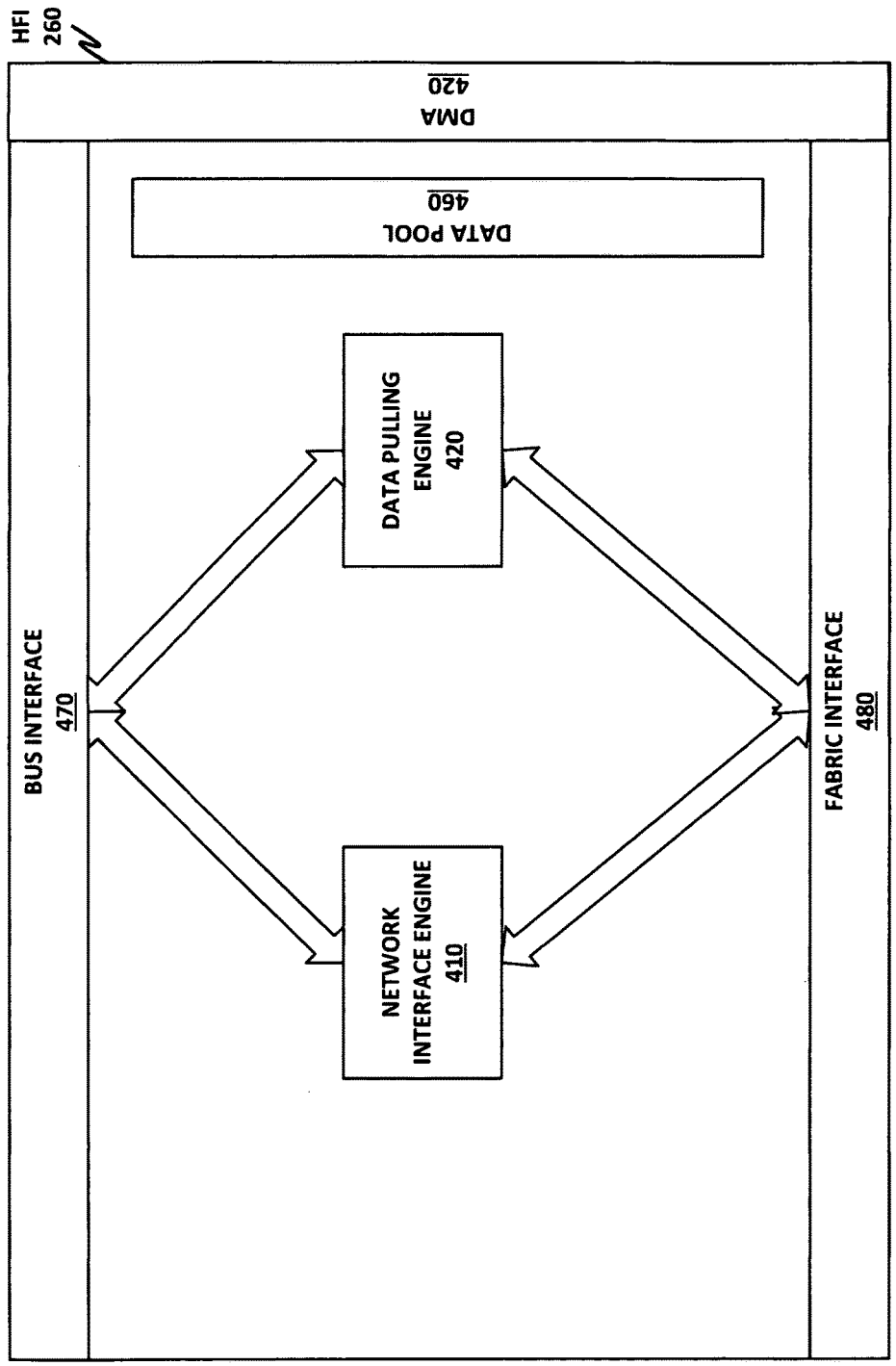
FIG. 4 is a block diagram of a host fabric interface (HFI) according to one or more examples of the present specification.

It should be noted that when producer 340 initially produces the data, producer 340 does not need to know which specific compute node 110 that the data will go to. Rather, producer 340 can simply designate the species of each new datum, store it in memory, and notify DPE 420 (FIG. 4). Once the datum is stored in memory, data pulling engine 420 of HFI 260 can publish a notice that data of the species are available. The data pulling engine can then handle any additional messaging concerning those data.

FIG. 4 is a block diagram of an HFI 260 according to one or more examples of the present specification. In this case, HFI 260 includes a bus interface 470, a fabric interface 480, and a DMA interface 420. Fabric interface 480 is to communicatively couple HFI 260 to fabric 170. Bus interface 470 is to communicatively couple HFI 260 to a local bus of the compute node, such as bus 270 of FIG. 2. And DMA 420 is to communicatively couple HFI 260 to a DMA such as DMA 270-3 of FIG. 2.

HFI 260 also includes a network interface engine 410. Network interface engine 410 provides traditional input/output operations and management of the fabric interface. Thus in this respect, network interface engine 410 may be similar or identical to the function performed by an HFI in certain existing architectures.

HFI 260 also includes data pulling engine 420. Data pulling engine 420 provides methods according to the present specification. Data pulling engine 420 may be any suitable engine, including any combination of hardware, software, and/or firmware as discussed above.

Figure 5:
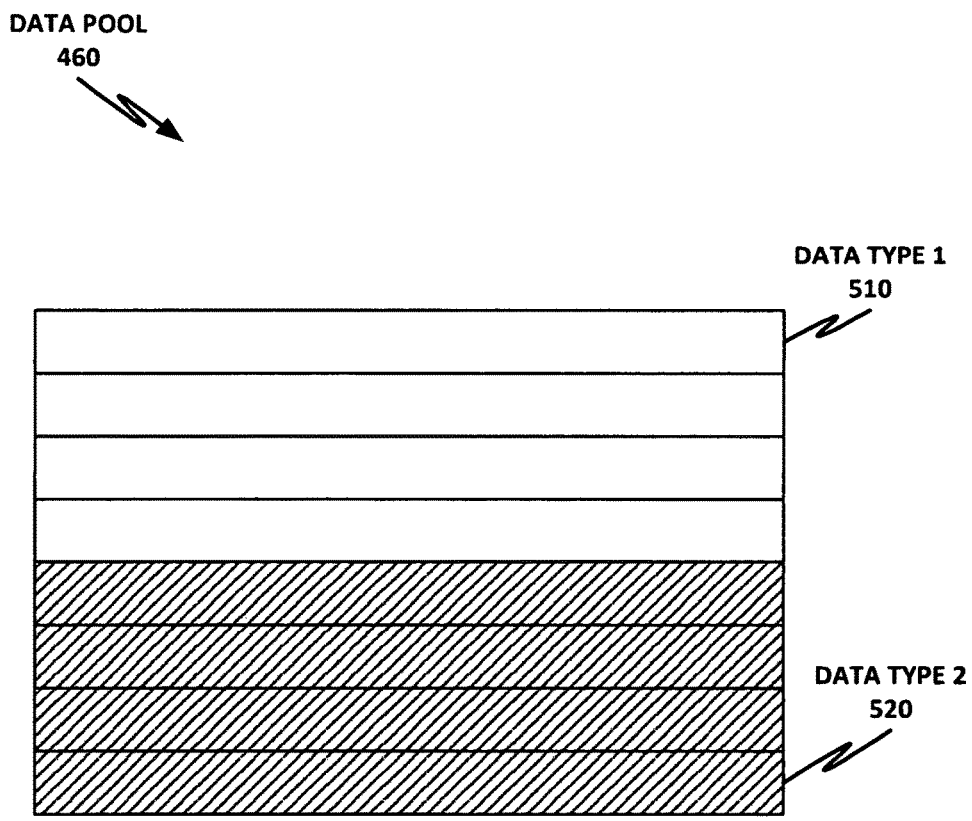
FIG. 5 is a block diagram of species of memory according to one or more examples of the present specification.

HFI 260 may also include a data pool 460. Data pool 460 may include data that can be provided to consumers according to the methods of the present specification. As illustrated in FIG. 5, data pool 460 may include data of a plurality of different species. In the example of FIG. 5, data pool 460 includes data species 1 510, and data species 2 520. Thus, when a consumer 350 requests data, it may specify the species of data that it is interested in. If a consumer 350 requests data of species 1 510, then data pulling engine 420 may select any datum from data species 510 (for example, according to an algorithm such as FIFO or LIFO), and provide that datum to consumer 350. If a consumer 350 requests a datum of species 2, then data pulling engine 420 may select any suitable datum of species 2 520, and provide that datum to consumer 350. It should be noted that data pool 460 may be the actual data, or it may simply be notifications that instruct data pulling engine 420 where to retrieve data from memory 220.

Figure 6:
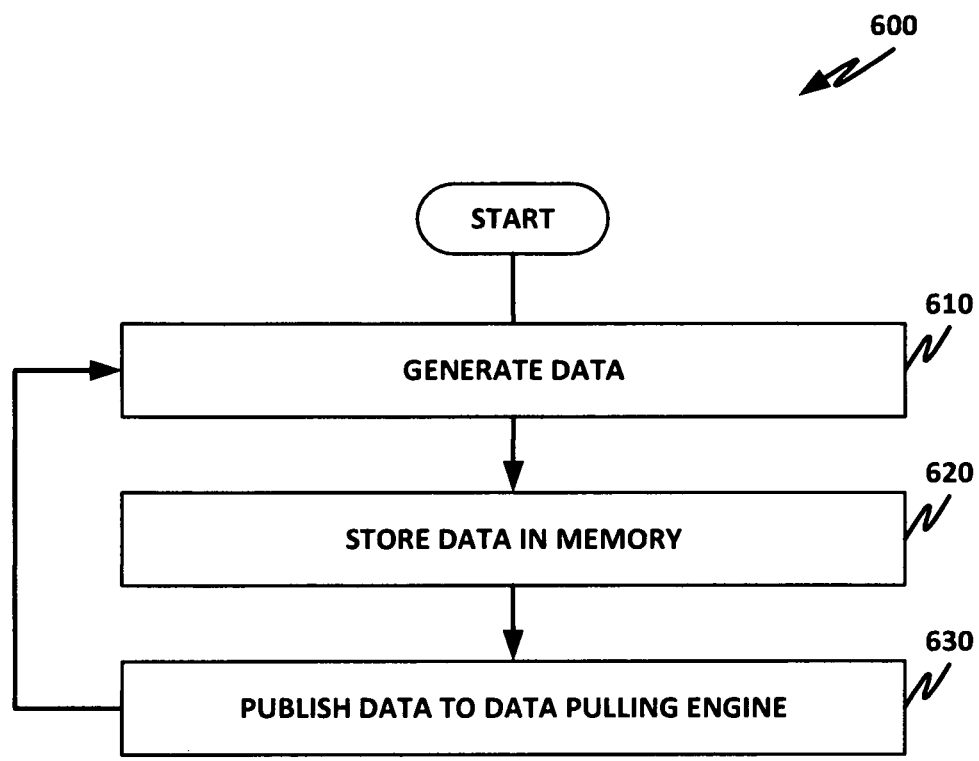
FIG. 6 is a flow chart of a method performed by a data producer according to one or more examples of the present specification.

FIG. 6 is a flowchart of a method 600 performed by a producer engine 224 according to one or more examples of the present specification. In this example, at block 610, producer engine 224 generates data.

In block 620, producer engine 224 stores the produced data in local memory 220.

In block 630, producer engine 224 publishes the data to data pulling engine 420 of HFI 260. In an example, publishing to data pulling engine 420 comprises notifying data pulling engine 420 that data are available for sending to a requesting consumer 350. When producer engine 224 publishes the data, data pulling engine 420 may either access it from its original location, or may copy it to a local buffer.

Publishing does not necessarily imply broadcasting data availability to consumers 350, as may be done in a true "two-way" exchange. Rather, producer engine 224 merely notifies data pulling engine 420 that data are available, and is then essentially done with its part of the transaction. Thus, control can pass back to block 610, where producer 340 continues producing data without regard to what data pulling engine 420 does with those data. In the meantime, data pulling engine 420 holds onto the data in its data pool until it receives a data request from a consumer 350.

In some embodiments, it is possible that data pulling engine 420 could notify producer 340 that its data pool is full, as may be the case if consumers 350 are not ready to retrieve data. In that case, producer 340 may suspend production of data, and either periodically poll data pulling engine 420, or wait for a signal from data pulling engine 420 that it is ready to receive more data.

Figure 7:
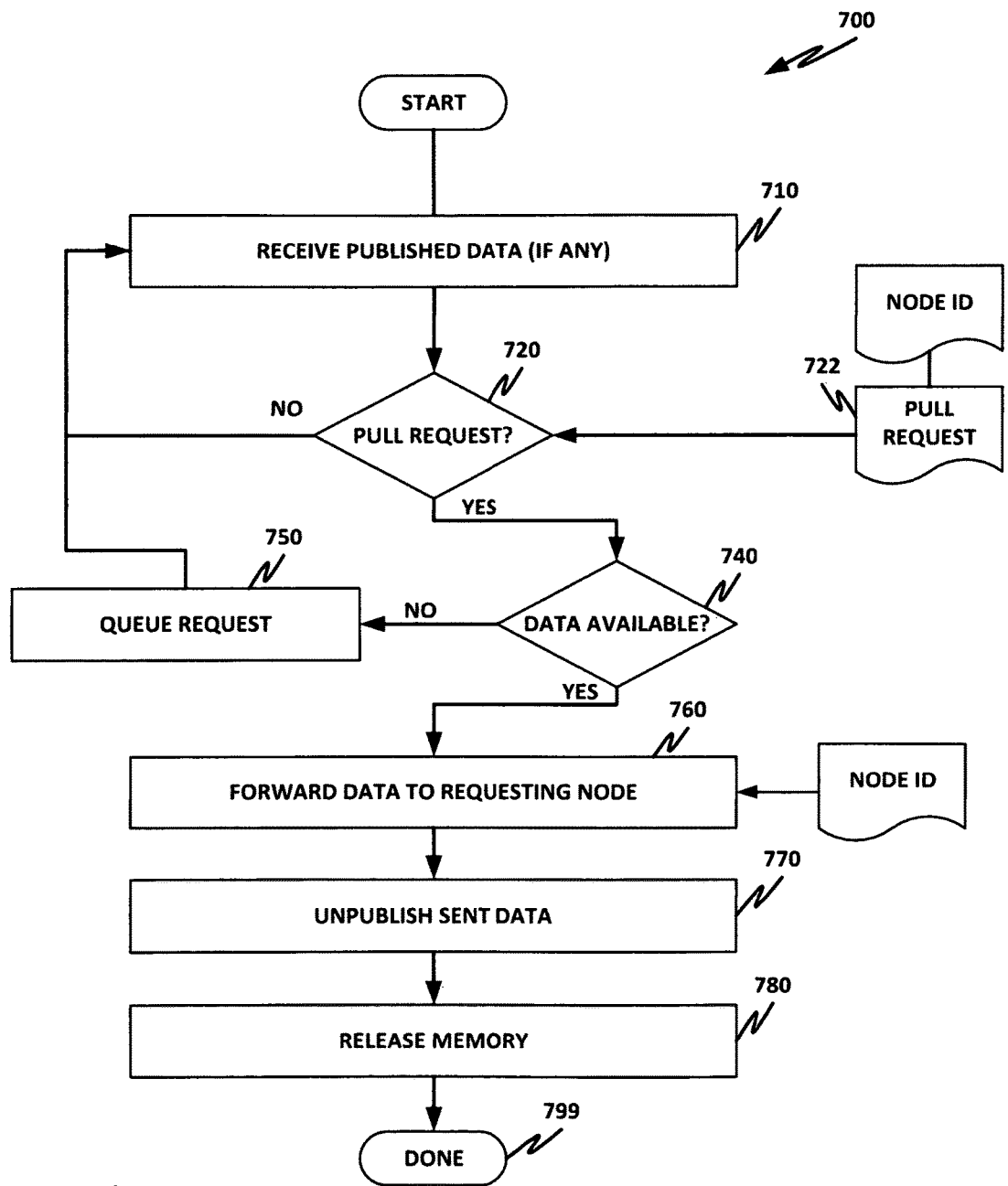
FIG. 7 is a flow chart of a method performed by an HFI data pulling engine (DPE) according to one or more examples of the present specification.

FIG. 7 is a flowchart of a method 700 performed by data pulling engine 420 of HFI 260 according to one or more examples of the present specification.

At block 710, data pulling engine 420 of HFI 260 receives from producer engine 224 published data (if any). These may be data that come from data pool 460.

In decision block 720, if data pulling engine 420 does not receive a pull request, then it continues to receive published data as before.

If on the other hand, data pulling engine 420 receives a pull request 722, then control may proceed to block 730. It should be noted that pull request may include a node identifier for a consumer 350 that is requesting the data. Pull requests 722 may also include a species identifier for the species of data that is being requested. Pull requests 722 may also include any other header information or other packet format that is suitable for their purpose.

In decision block 740, data pulling engine 420 checks whether there are data available in the data pool of the type requested.

In block 750, if no data are available, then in an embodiment, data pulling engine 420 may queue pull request 722. Optionally, data pulling engine 420 may send a signal to consumer 350 indicating that the request cannot be serviced immediately, but that the request has been queued. If ordering is enabled, then queued requests may be handled in a first-in-first-out order. In that case, queued requests may be handled before new data are added to the pool. If ordering is not enabled, then attempts to match pending pull requests may be performed in parallel after data have been added to the pool.

In block 760, data pulling engine 420 forwards the requested data to the requesting consumer node 350. To do this, data pulling engine 420 specifically directs the message to the node ID of the requesting consumer 350. It should also be noted again, that datum it sends may simply be a datum selected from data pool 460, and need not be a specific datum selected or requested by consumer 350.

In block 770, data pulling engine 420 unpublishes the data that it sent in block 760. This indicates that the datum is no longer available for sending to a consumer 350.

In block 780, data pulling engine 420 releases the memory location of the sent datum. Releasing the memory location may include simply marking the memory location as available for use again. In some cases where security is of a premium concern, this may also include zeroing the memory, or otherwise overwriting or erasing it.

In block 799, the method is done.

Figure 8:
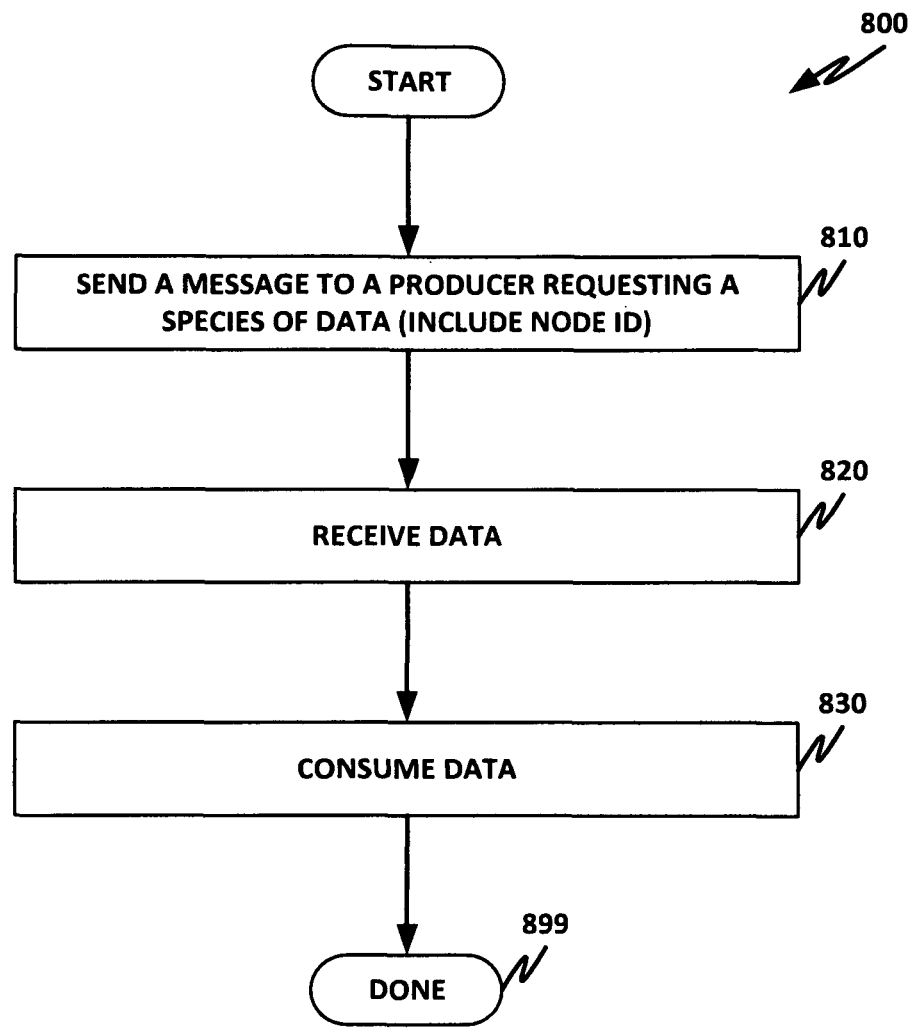
FIG. 8 is a flow chart of a method performed by a data consumer according to one or more examples of the present specification.

FIG. 8 is a flowchart of a method 800 performed by a consumer engine 224 according to one or more examples of the present specification. When a compute node 110 is acting as a consumer 350, it may send a message to a producer requesting a species of data. This message may include a node ID for consumer 350. Note that this message need not include a node ID for producer 340. Rather, the availability of data may be published or advertised by data pulling engine 420, and consumer 350 may simply respond by requesting a datum for itself.

In block 820, consumer engine 224 receives the requested datum.

In block 830, consumer engine 224 consumes the datum.

In block 899, the method is done. It should be noted that in certain embodiments, the method 800 a FIG. 8 may be enabled by a network interface engine 410 that need not be specially modified as in the case of data pulling engine 420.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in example 1, a compute node, comprising: first one or more logic elements for providing a data producer engine to produce a datum; and a host fabric interface to communicatively couple the compute node to a fabric, the fabric interface comprising second one or more logic elements for providing a data pulling engine, the data pulling engine to: publish the datum as available; receive a pull request for the datum, the pull request comprising a node identifier for a data consumer; and send the datum to the data consumer via the fabric.

There is disclosed in example 2, the compute node of example 1, wherein the compute node is to store the datum in a local memory at a memory location.

There is disclosed in example 3, the compute node of example 2, wherein the data pulling engine is further to release the memory location after sending the data.

There is disclosed in example 4, the compute node of example 3, wherein releasing the memory location comprises marking the memory location as available for reuse.

There is disclosed in example 5, the compute node of example 2, wherein the datum is of a first species, and the local memory is further to receive a second datum of a second species.

There is disclosed in example 6, the compute node of example 5, wherein the pull request comprises a species designation, and wherein data pulling engine is to select between the datum of the first species and the second datum of the second species based at least in part on the species designation.

There is disclosed in example 7, the compute node of example 2, wherein the datum is of a first species, the local memory is to receive a plurality of data of the first species, and wherein sending the datum to the data consumer comprises sending any one of the data of the first species to the data consumer.

There is disclosed in example 8, the compute node of any of examples 1-7, wherein the data pulling engine is further to unpublish the data after sending the data.

There is disclosed in example 9, the compute node of any of examples 1-7, wherein the data pulling engine is further to: send a pull request to a second data pulling engine; and receive a datum from the second data pulling engine.

There is disclosed in example 10, a host fabric interface, comprising: first one or more logic elements for providing a network interface engine to communicatively couple the host fabric interface to a fabric; second one or more logic elements for providing a bus interface engine to communicatively couple the host fabric interface to a data producer engine; and third one or more logic elements comprising a data pulling engine, the data pulling engine to: determine that a datum is available from the data producer engine and is stored in a memory location of a local memory; publish the datum as available via the fabric; receive a pull request for the datum via the fabric, the pull request comprising a node identifier for a data consumer; and send the datum to the data consumer via the fabric.

There is disclosed in example 11, the host fabric interface of example 10, wherein the data producer is to store the datum in a local memory at a memory location.

There is disclosed in example 12, the host fabric interface of example 11, wherein the data pulling engine is further to release the memory location after sending the data.

There is disclosed in example 13, the host fabric interface of example 12, wherein releasing the memory location comprises marking the memory location as available for reuse.

There is disclosed in example 14, the host fabric interface of example 11, wherein the datum is of a first species, and the local memory is further to receive a second datum of a second species.

There is disclosed in example 15, the host fabric interface of example 14, wherein the pull request comprises a species designation, and wherein data pulling engine is to select between the datum of the first species and the second datum of the second species based at least in part on the species designation.

There is disclosed in example 16, the host fabric interface of example 11, wherein the datum is of a first species, the local memory is to receive a plurality of data of the first species, and wherein sending the datum to the data consumer comprises sending any one of the data of the first species to the data consumer.

There is disclosed in example 17, the host fabric interface of any of examples 10-16, wherein the data pulling engine is further to unpublish the data after sending the data.

There is disclosed in example 18, the host fabric interface of any of examples 10-16, wherein the data pulling engine is further to: send a pull request to a second data pulling engine; and receive a datum from the second data pulling engine.

There is disclosed in example 19, a method of providing a data pulling engine, comprising: communicatively coupling to a fabric; communicatively coupling to a data producer; and determining that a datum is available from the data producer and is stored in a memory location of a local memory; publishing the datum as available via the fabric; receive a pull request for the datum via the fabric, the pull request comprising a node identifier for a data consumer; and send the datum to the data consumer via the fabric.

There is disclosed in example 20, the method of example 19, further comprising releasing the memory location after sending the data.

There is disclosed in example 21, the method of example 20, wherein releasing the memory location comprises marking the memory location as available for reuse.

There is disclosed in example 22, the method of example 21, wherein the datum is of a first species, and the local memory is further to receive a second datum of a second species.

There is disclosed in example 23, the method of any of examples 19-22, wherein the pull request comprises a species designation, and wherein data pulling engine is to select between the datum of the first species and the second datum of the second species based at least in part on the species designation.

There is disclosed in example 24, the method of any of examples 19-22, wherein the datum is of a first species, the local memory is to receive a plurality of data of the first species, and wherein sending the datum to the data consumer comprises sending any one of the data of the first species to the data consumer.

There is disclosed in example 25, the method of any of examples 19-22, further comprising unpublishing the data after sending the data.

There is disclosed in example 26, an apparatus comprising means for performing the method of any of examples 19-25.

There is disclosed in example 27, the apparatus of example 26, wherein the means for performing the method comprise a processor and a memory.

There is disclosed in example 28, the apparatus of Example 27, wherein the memory comprises machine-readable instructions, that when executed cause the apparatus to perform the method of any of examples 19-25.

There is disclosed in example 29, the apparatus of any of Examples 26-28, wherein the apparatus is a computing system.

There is disclosed in example 30, at least one computer readable medium comprising instructions that, when executed, implement a method or realize an apparatus as described in any of examples 19-29.

There is disclosed in example 31, a method of providing a data pulling engine, comprising: communicatively coupling to a fabric; communicatively coupling to a data producer; and determining that a datum is available from the data producer and is stored in a memory location of a local memory, wherein the datum is of a first species, and wherein the memory is further to receive a datum of a second species; publishing the datum as available via the fabric; receiving a pull request for a datum of the first species via the fabric, the pull request comprising a node identifier for a data consumer; and sending the datum to the data consumer via the fabric.

There is disclosed in example 32, the method of example 31, further comprising: generating a datum of the first species; storing the datum in the memory; and publishing the datum to a data pulling engine.

There is disclosed in example 33, the method of example 31, further comprising: sending a message to a producer requesting a datum of the first species, the message comprising a node identifier; receiving the requested datum; and consuming the datum.

There is disclosed in example 34, an apparatus comprising means for performing the method of any of examples 31-33.

There is disclosed in example 35, the apparatus of example 34, wherein the means for performing the method comprise a processor and a memory.

There is disclosed in example 36, the apparatus of Example 35, wherein the memory comprises machine-readable instructions, that when executed cause the apparatus to perform the method of any of examples 31-33.

There is disclosed in example 37, the apparatus of any of Examples 34-36, wherein the apparatus is a computing system.

There is disclosed in example 38, at least one computer readable medium comprising instructions that, when executed, implement a method or realize an apparatus as described in any of examples 31-37.

There is also disclosed in an example, a multichip package comprising the compute node or host fabric interface of any preceding example, wherein the producer engine is provided on a first chip and the data pulling engine is provided on a second chip.

There is also disclosed in an example, a system-on-a-chip comprising the compute node of example 1, wherein the producer engine is provided on a first subassembly and the data pulling engine is provided on a second subassembly.

There is also disclosed in an example, an apparatus comprising the compute node of example 1, wherein the host fabric interface comprises a pluggable network card.

There is also disclosed in an example, a high-performance computing system comprising a plurality of the compute node of example 1.

What is claimed is:

1. A compute node, comprising:
    a processor;
    a memory;
    one or more tangible, non-transitory computer-readable mediums having stored thereon instructions to provide a data producer engine to produce a datum according to a high-performance computing (HPC) problem, and to publish the datum as available; and
    a host fabric interface to communicatively couple the compute node to a fabric, the host fabric interface comprising one or more logic elements for providing a data pulling engine, the data pulling engine to:
        provide a data pool comprising a species of data, wherein the species of data comprises a plurality of data, wherein each datum is an operator for the HPC problem,
        receive a pull request for a datum of the species, the request comprising a tag including a species identifier for the species and not requiring a specific datum of the species, the pull request further comprising a node identifier for a data consumer;
        select a datum of the species from the data pool;
        send the selected datum to the data consumer via the fabric; and
        remove the selected datum from the data pool.

2. The compute node of claim 1, wherein the compute node is to store the selected datum in a local memory at a memory location.

3. The compute node of claim 2, wherein the data pulling engine is further to release the memory location after sending the selected datum.

4. The compute node of claim 3, wherein releasing the memory location comprises marking the memory location as available for reuse.

5. The compute node of claim 2, wherein the selected datum is of a first species, and the local memory is further to receive a second datum of a second species.

6. The compute node of claim 5, wherein the data pulling engine is to select between the datum of the first species and the second datum of the second species based at least in part on the species designation.

7. The compute node of claim 1, wherein the data pulling engine is further to unpublish the data after sending the selected datum.

8. The compute node of claim 1, wherein the data pulling engine is further to:
    send a pull request to a second data pulling engine; and
    receive a datum from the second data pulling engine.

9. A multichip package comprising the compute node of claim 1, wherein the data producer engine is provided on a first chip and the data pulling engine is provided on a second chip.

10. A system-on-a-chip comprising the compute node of claim 1, wherein the data producer engine is provided on a first subassembly and the data pulling engine is provided on a second subassembly.

11. An apparatus comprising the compute node of claim 1, wherein the host fabric interface comprises a pluggable network card.

12. A high-performance computing system comprising a plurality of the compute node of claim 1.

13. A host fabric interface, comprising:
    a network interface comprising circuitry to communicatively couple the host fabric interface to a fabric;
    a bus interface engine comprising circuitry to communicatively couple the fabric interface to a data producer; and
    a data pulling engine, the data pulling engine to:
        provide a data pool comprising a species of data, wherein the species of data comprises a plurality of data, wherein each datum is an operator for a high-performance computing (HPC) problem,
        determine that a datum according to the HPC problem is available from the data producer and is stored in a memory location of a local memory;
        publish the datum as available via the fabric;
        receive a pull request via the fabric for a datum of the species, the request comprising a tag including a species identifier for the species and not requiring a specific datum of the species, the pull request further comprising a node identifier for a data consumer;
        select a datum of the species from the data pool;
        send the selected datum to the data consumer via the fabric; and
        remove the selected datum from the data pool.

14. The host fabric interface of claim 13, wherein the data producer is to store the selected datum in a local memory at a memory location.

15. The host fabric interface of claim 14, wherein the data pulling engine is further to release the memory location after sending the selected datum.

16. The host fabric interface of claim 15, wherein releasing the memory location comprises marking the memory location as available for reuse.

17. The host fabric interface of claim 14, wherein the selected datum is of a first species, and the local memory is further to receive a second datum of a second species.

18. The host fabric interface of claim 17, wherein the data pulling engine is to select between the datum of the first species and the second datum of the second species based at least in part on the species designation.

19. The host fabric interface of claim 13, wherein the data pulling engine is further to unpublish the data after sending the selected datum.

20. The host fabric interface of claim 13, wherein the data pulling engine is further to:
    send a pull request to a second data pulling engine; and
    receive a datum from the second data pulling engine.

21. A method of providing data, comprising:
determining that a datum according to a high-performance computing (HPC) problem is available from a data producer and is stored in a memory location of a local memory;
publishing the datum as available via a fabric;
providing a data pool comprising a species of data, wherein the species of data comprises a plurality of data, wherein each datum is an operator for the HPC problem;
receiving a pull request for a datum of the species via the fabric, the request comprising a tag including a species identifier for the species and not requiring a specific datum of the species, the pull request further comprising a node identifier for a data consumer;
selecting a datum of the species from the data pool;
sending the selected datum to the data consumer via the fabric; and
removing the selected datum from the data pool.

22. The method of claim 21, further comprising releasing the memory location after sending the selected datum.

23. The method of claim 22, wherein releasing the memory location comprises marking the memory location as available for reuse.

24. The method of claim 23, wherein the selected datum is of a first species, and the local memory is further to receive a second datum of a second species.

25. The method of claim 24, further comprising selecting between the datum of the first species and the second datum of the second species based at least in part on the species designation.

26. The method of claim 21, further comprising unpublishing the data after sending the selected datum.

* * * * *